United States Patent Office 2,944,054
Patented July 5, 1960

2,944,054

SUBSTITUTED PHENOTHIAZINYLALKYL AMINO-SULFONYLPIPERAZINES

Maxwell Gordon, Elkins Park, Pa., assignor to Smith Kline & French Laboratories, Philadelphia, Pa., a corporation of Pennsylvania No Drawing. Filed Sept. 30, 1958, Ser. No. 764,264

6 Claims. (Cl. 260—243)

This invention relates to novel substituted 1-aminosulfonyl - 4 - (10 - phenothiazinylalkyl) - piperazines having valuable pharmacodynamic properties. More specifically, the compounds of this invention are useful as tranquilizers, antiemetics, sedatives, antihistaminics, anticonvulsants and potentiators or various central nervous system depressants, such as analgetics or anesthetics. In particular, these compounds are useful as tranquilizers and antiemetics.

The substituted 1-aminosulfonyl-4-(10-phenothiazinylalkyl)-piperazines of this invention are represented by the following general formula:

FORMULA 1

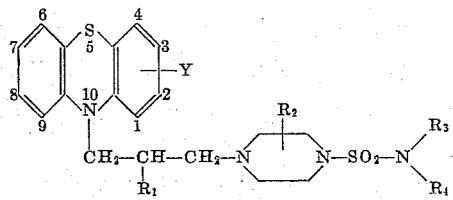

when:

Y represents hydrogen, chlorine, methyl, trifluoromethyl, methoxy, acetyl, methylmercapto, trifluoromethylmercapto, methylsulfonyl, trifluoromethylsulfonyl, or cyano;

$R_1$ represents hydrogen or methyl;

$R_2$ represents hydrogen, methyl or ethyl; and $R_3$ and $R_4$ represent hydrogen, methyl, ethyl or, taken together with the nitrogen to which they are attached, a monocyclic six-membered heterocyclic ring, such as piperidinyl, piperazinyl or N-methylpiperazinyl.

The Y moiety is preferably in the 2-position of the phenothiazine ring.

Advantageous compounds of this invention are represented by the following structural formula:

FORMULA 2

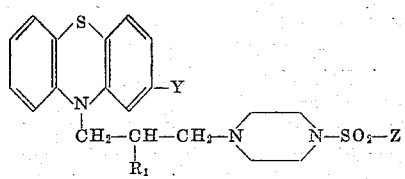

when:

Y represents chlorine, trifluoromethyl, methylmercapto, trifluoromethylmercapto, methylsulfonyl, trifluoromethylsulfonyl, or cyano;

$R_1$ represents hydrogen or methyl; and

Z represents dimethylamino, diethylamino, piperidinyl, piperazinyl or N-methylpiperazinyl.

Preferred compounds of this invention are represented by Formula 2 when:

Y represents trifluoromethyl;

$R_1$ represents hydrogen or methyl; and

Z represents dimethylamino or N-methylpiperazinyl.

A particular preferred and advantageous compound is 1 - dimethylsulfamyl - 4 - [3 - (2 - trifluoromethyl - 10 - phenothiazinyl)-propyl]-piperazine.

By the term "aminosulfonyl" where used herein alone or in combination with other terms, N-unsubstituted sulfamyl, N,N-dimethyl- or diethylsulfamyl, or heterocyclic amino sulfonyl groups such as piperidinyl-, piperazinyl- or N-methylpiperazinylsulfonyl, are indicated.

This invention also includes acid addition salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The novel substituted 1-aminosulfonyl-4-(10-phenothiazinylalkyl)-piperazines of this invention are prepared by reacting substituted 10-piperazinylalkyl phenothiazines with an aminosulfonyl halide represented as follows:

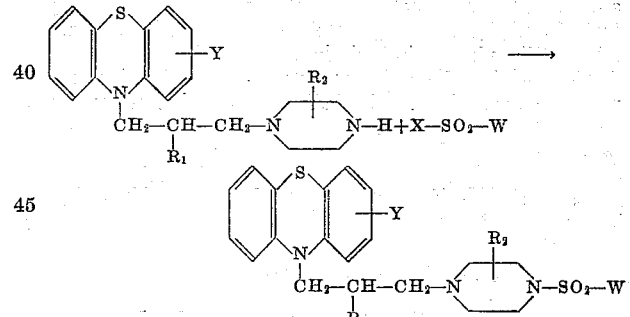

when X represents a halogen atom, preferably chlorine or bromine;

W represents dimethylamino, diethylamino, piperidinyl or N-methylpiperazinyl; and Y, $R_1$ and $R_2$ are as defined above.

The alkylation reaction is carried out advantageously by refluxing the reactants in a suitable inert aromatic solvent such as benzene, toluene or xylene, for from 2 to 12 hours. The product is isolated by cooling the reaction mixture and filtering the hydrohalide salt which separates. The solid product is purified by recrystallization. To obtain the free base, an aqueous solution of the hydrohalide salt is neutralized with dilute alkali, extracted with for example benzene or chloroform, the extract evaporated in vacuo and the base optionally purified by vacuum distillation. The free base is then converted to other acid addition salts of this invention as outlined above.

Alternatively, the alkylation reaction is carried out in the presence of an acid-binding agent to tie up the hydrohalic acid formed. Exemplary of suitable acid-binding agents are tertiary organic amines such as triethylamine, trimethylamine, and the like, or alkali metal carbonates for example sodium or potassium carbonate. The product is obtained by filtering the reaction mixture and removing the solvent.

The sulfonyl chlorides or bromides used as outlined above are prepared advantageously by reacting for example sulfuryl chloride with a secondary amine such as dimethylamine to give dimethylsulfamylchloride. The reaction is preferably carried out in the presence of an acid-binding agent such as triethylamine, trimethylamine and the like, and in an inert organic solvent such as benzene, toluene or xylene.

The N-unsubstituted and N-monosubstituted sulfamyl compounds of this invention (in Formula 1, $R_3$ is hydrogen and $R_4$ is hydrogen, methyl or ethyl) are advantageously prepared by reacting a substituted 10-piperazinylalkyl phenothiazine with a large excess of for example sulfuryl chloride in an inert organic solvent such as benzene, toluene or xylene. The reaction is preferably carried out at from 0–10° C. and in the presence of an acid-binding agent such as triethylamine, trimethylamine and the like. Upon filtration of the reaction mixture and removal of the solvent, the resulting 10-chlorosulfonylpiperazinylalkyl phenothiazine is added to a large excess of ammonia, methylamine or ethylamine dissolved in an organic solvent such as benzene, toluene or xylene at from 0–10° C. to yield the corresponding sulfamyl compound.

The N-hydrogenpiperazinylsulfonyl compounds of this invention ($R_3$ and $R_4$ in Formula 1 taken together is N-hydrogenpiperazinyl) are advantageously prepared by reacting for example N-carbethoxypiperazine dissolved in a solvent such as benzene, toluene or xylene with sulfuryl chloride at from 0–10° C. The reaction is preferably carried out in the presence of an acid-binding agent such as triethylamine, trimethylamine and the like. The resulting 1-carbethoxy-4-chlorosulfonylpiperazine derivative obtained upon filtration of the reaction mixture and removal of the solvent is then reacted with a substituted 10-piperazinylalkyl phenothiazine as described above. The N-carbethoxy protective group is finally hydrolyzed by refluxing in for example ethanol with dilute sodium hydroxide solution.

The substituted 10-piperazinylalkyl phenothiazines are prepared according to the following reaction sequence:

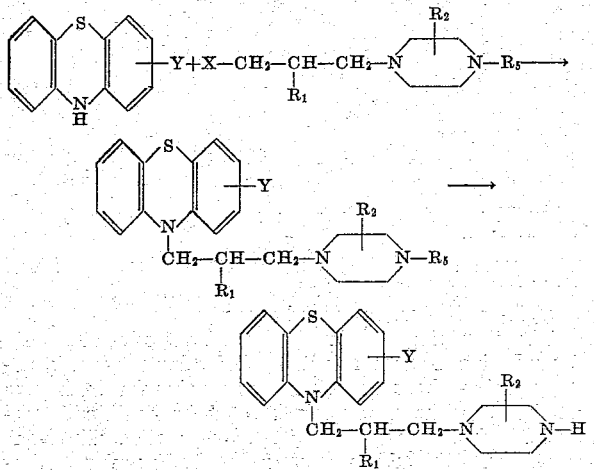

when X represents a halogen atom, preferably chlorine or bromine;

$R_5$ represents benzyl, formyl, carbobenzoxy, carbomethoxy or carbethoxy; and

Y, $R_1$, and $R_2$ are as defined above.

The substituted phenothiazines are prepared following known synthetic methods. Thus, a substituted 2-halo-2'-aminodiphenyl sulfide is cyclized by refluxing in dimethylformamide in the presence of an acid-binding agent, for example sodium or potassium carbonate, and catalytic amounts of copper or copper bronze powder for from 6 to 18 hours. Alternatively, a substituted diphenylamine is heated with sulfur and with or without a solvent in the presence of a catalytic amount of iodine at from 120 to 230° C. for from one to four hours.

The substituted phenothiazines are alkylated advantageously as shown above, with an ω-haloalkylpiperazine having the free N-hydrogen of the piperazinyl moiety replaced by $R_5$, defined as above, which is an easily removed moiety. $R_5$ is preferably carbethoxy. The alkylation is carried out advantageously by refluxing an ω-haloalkylpiperazine, preferably chloro or bromo, and a substituted phenothiazine in a suitable inert aromatic solvent such as preferably, benzene, toluene or xylene, in which at least one of the reactants must be soluble. A suitable acid-binding agent is usually included, such as an alkali metal amide, preferably sodium, potassium or lithium amide. The reaction mixture is refluxed for from 3 to 18 hours and worked up after cooling by adding an excess of water, extracting with dilute hydrochloric acid, neutralizing with base and extracting with benzene. Evaporation of the benzene extracts yields the residual base. The N-protective group, $R_5$, is then removed under mild conditions, such as by alkaline hydrolysis with for example sodium hydroxide solution in the case of the preferred carbethoxy group.

Another synthetic route to 10-piperazinylalkyl phenothiazines is by means of 10-(ω-ester-alkyl)-phenothiazines which have a reactive end group on the 10-alkyl chain, for example an ω-tosylate or ω-chloro end group, which can be reacted with a piperazine having one N-hydrogen replaced by $R_5$ as described above. For example, the ester and piperazine are refluxed in the presence of an acid-binder for a short period and further worked up as described above. Further, the 10-(ω-ester-alkyl)-phenothiazine can be reacted with for example dimethylsulfamylpiperazine or diethylsulfamylpiperazine to give the corresponding novel products of this invention directly.

The foregoing is a general description of the main synthetic routes in the preparation of substituted 1-aminosulfonyl-4-(10-phenothiazinylalkyl)-piperazines. It will be readily apparent to one skilled in the art that variations of these procedures are possible. Of particular advantage as preparative procedures are the methods thoroughly discussed above, namely, alkylation of substituted 10-piperazinylalkyl phenothiazines with an aminosulfonyl halide and alkylation of substituted phenothiazines in the 10-position of the nucleus by an ω-haloalkylpiperazine having the free N-hydrogen of the piperazine moiety replaced by $R_5$, as defined hereinbefore.

It will be readily apparent to one skilled in the art that certain of the compounds of this invention, notably those in which $R_1$ is represented by methyl so that an asymmetric carbon atom is formed may be present as optical isomers. The connotation of the general formulae presented herein is to include all isomers, particularly the separated $d$ or $l$ optical isomers as well as the $dl$ mixture of these isomers. If desired, the isomers may be separated for individual use by separation methods known to the art, such as fractional crystallization, for instance, of the $d$-tartrate salts of the substituted 1-aminosulfonyl-4-(10-phenothiazinylalkyl)-piperazine derivatives. Alternatively, a synthesis starting with an optically active side chain may yield the desired optical isomer.

The following examples are not limiting but are illustrative of compounds of this invention and the procedures for their preparation and will serve to make fully apparent all of the compounds embraced by the general formula given above and the preparation thereof respectively.

*Example 1*

A mixture of 13.3 g. of 2-trifluoromethylphenothiazine (Belgian Patent 551,400) and 2.0 g. of sodium amide in 100 ml. of toluene is refluxed with stirring for 15 minutes. A solution of 12.9 g. of N-carbethoxy-N'-(3-chloropropyl)-piperazine [prepared by condensing 1-(3-hydroxypropyl)-piperazine with ethyl chloroformate and treating the resulting hydroxy compound with thionyl chloride] in 50 ml. of toluene is added and the refluxing continued for five hours. The reaction mixture is cooled, diluted with 50 ml. of water and the toluene layer is extracted with dilute hydrochloric acid. The acid extracts are made basic with ammonia and then extracted with benzene. Removal of the benzene in vacuo leaves 10-[3-(N-carbethoxypiperazinyl) - propyl] - 2 - trifluoromethylphenothiazine as the residue.

A solution of 11.5 g. of 10-[3-(N-carbethoxypiperazinyl)-propyl]-2-trifluoromethylphenothiazine in 50 ml. of ethanol and 50 ml. of water containing 2.5 ml. of 40% sodium hydroxide solution is refluxed for two hours. The ethanol is distilled off in vacuo and the residue is treated with benzene and water. The organic layer is separated, dried and evaporated to give 10-(3-piperazinylpropyl)-2-trifluoromethylphenothiazine.

A solution of 6.1 g. of dimethylsulfamylchloride in 15 ml. of toluene is added dropwise to a solution of 15.3 g. of 10-(3-piperazinylpropyl)-2-trifluoromethylphenothiazine in 30 ml. of toluene and the resulting solution is refluxed for 2½ hours. The white solid which separates upon cooling is removed by filtration, washed with benzene and recrystallized from isopropanol to give 1-dimethylsulfamyl - 4 - [3-(2-trifluoromethyl - 10 - phenothiazinyl)-propyl]-piperazine hydrochloride, M.P. 180° C.

An aqueous solution of the hydrochloride is neutralized with dilute sodium hydroxide solution. Extraction with chloroform and evaporation of the chloroform gives the free base, 1-dimethylsulfamyl-4-[3-(2-trifluoromethyl-10-phenothiazinyl)-propyl]-piperazine.

Example 2

A solution of 18.8 g. of diethylsulfamylchloride in 50 ml. of toluene is added slowly to a solution of 35.9 g. of 10-(3-piperazinylpropyl)-2-chlorophenothiazine (British Patent 780,193) in 150 ml. of toluene and the resulting mixture is refluxed for three hours. Upon cooling a solid material separates which is isolated by filtration. After washing with benzene and recrystallizing from isopropyl alcohol, 1-diethylsulfamyl-4-[3-(2-chloro-10-phenothiazinyl)-propyl]-piperazine hydrochloride is obtained.

An aqueous solution of the hydrochloride is neutralized with dilute sodium hydroxide solution. Extraction with benzene and evaporation of the benzene extracts gives the free base, 1-diethylsulfamyl-4-[3-(2-chloro-10-phenothiazinyl)-propyl]-piperazine.

The free base (1.0 g.) in 75 ml. of ethyl acetate is treated with three equivalents of maleic acid which upon concentration and cooling gives the trimaleate salt.

Example 3

A mixture of 5.0 g. of phenothiazine, 0.6 g. of lithium amide and 6.8 g. of N-carbethoxy-N'-(3-chloro-2-methylpropyl)-piperazine (prepared from the reaction of N-carbethoxypiperazine and 1-bromo-3-chloro-2-methylpropane) in 150 ml. of toluene is refluxed for eight hours and then worked up as in Example 1 to give 10-[3-(N-carbethoxypiperazinyl)-2-methylpropyl]-phenothiazine.

A solution of 12.3 g. of the above-prepared phenothiazine in 100 ml. of ethanol is refluxed with 30 ml. of water containing 3 ml. of 40% sodium hydroxide solution for two hours. Evaporation of the solvent and treating the reaction mixture as described in Example 1 gives 10-(2-methyl-3-piperazinylpropyl)-phenothiazine.

An excess of sulfuryl chloride (27.0 g.) is added to a solution of 6.8 g. of 10-(2-methyl-3-piperazinylpropyl)-phenothiazine and 2.0 g. of triethylamine in 100 ml. of benzene at 0° C. The resulting mixture is subsequently filtered and the filtrate evaporated in vacuo to give 1-chlorosulfonyl-4-[2-methyl - 3 - (10-phenothiazinyl)-propyl]-piperazine.

A solution of 4.4 g. of the above-prepared chlorosulfonyl piperazine in 50 ml. of benzene is added to a large excess of ammonia dissolved in benzene at 0° C. The solvent is removed in vacuo to give after purification of the residue 1-sulfamyl-4-[2-methyl-3-(10-phenothiazinyl)-propyl]-piperazine.

Treating the free base with anhydrous hydrogen bromide gas in an ether solution yields the trihydrobromide salt.

Example 4

A suspension of 21.3 g. of 2-methylphenothiazine (U.S. Patent 2,785,160), 4.0 g. of sodamide and 25.0 g. of 1-carbethoxy-4-(3-chloropropyl)-3-methylpiperazine (prepared by reacting 2-methylpiperazine with ethyl chloroformate, then with trimethylene bromohydrin and finally replacing the 3-hydroxy group with chloro by treating with thionyl chloride) in 300 ml. of toluene is heated at reflux for ten hours. The cooled mixture is diluted with water and the toluene layer is extracted with dilute hydrochloric acid. The acid extracts are made basic with ammonia and extracted with benzene. Removal of the solvent yields 10-[3-(1-carbethoxy-3-methyl-4-piperazinyl)-propyl] - 2 - methylphenothiazine. The carbethoxy group is hydrolyzed in aqueous ethanol with 40% sodium hydroxide solution as outlined in Example 1.

To a solution of 3.5 g. of 2-methyl-10-[3-(2-methyl-1-piperazinyl)-propyl]-phenothiazine in 25 ml. of benzene is added dropwise a solution of 1.6 g. of dimethylsulfamylchloride in 20 ml. of benzene. The resulting mixture is refluxed for five hours and cooled. The white solid is filtered off, washed with benzene and recrystallized to give 1-dimethylsulfamyl-4-[3-(2-methyl-10-phenothiazinyl)-propyl]-3-methylpiperazine hydrochloride.

An aqueous solution of the hydrochloride salt is neutralized with ammonia and extracted with benzene.

The free base is treated with mandelic acid in ethyl acetate solution to furnish the trimandelate salt.

Example 5

A solution of 18.0 g. of 2-methoxyphenothiazine (U.S. Patent 2,785,160) in 250 ml. of toluene is alkylated with 19.0 g. 1-carbethoxy-4-(3-chloropropyl)-2-methylpiperazine (prepared by condensing trimethylene bromohydrin with 1-carbethoxy-2-methylpiperazine and treating the resulting hydroxy compound with thionyl chloride) in the presence of 3.2 g. of sodium amide as described in Example 1 to give 10-[3-(1-carbethoxy-2-methyl-4-piperazinyl)-propyl] - 2 - methoxyphenothiazine. This latter compound is then refluxed in an aqueous ethanol solution containing 40% sodium hydroxide solution to hydrolyze the carbethoxy group.

A solution of 3.2 g. of dimethylsulfamylchloride in 10 ml. of toluene is added slowly to 7.4 g. of 2-methoxy-10-[3-(3-methyl-1-piperazinyl)-propyl]-phenothiazine in 25 ml. of toluene and the resulting mixture is refluxed for two hours. Upon cooling, a white solid forms which is isolated by filtration, washed with benzene and recrystallized to yield 1-dimethylsulfamyl-4-[3-(2-methoxy-10-phenothiazinyl)-propyl]-2-methylpiperazine hydrochloride.

The hydrochloride salt in aqueous solution is neutralized with dilute aqueous sodium hydroxide solution. Extraction with chloroform and evaporation of the chloroform extracts in vacuo gives 1-dimethylsulfamyl-4-[3-(2-methoxy-10-phenothiazinyl)-propyl]-2-methylpiperazine.

Example 6

A mixture of 6.2 g. of 2-acetyl-10-(3-chloropropyl)-phenothiazine (South African Patent 2,798), 0.8 g. of sodium amide and 3.6 g. of 1-carbethoxypiperazine in 250 ml. of toluene is stirred and refluxed for eight hours. The reaction mixture is cooled, diluted with 100 ml. of water and the toluene layer is extracted with dilute hydrochloric acid. The acid extracts are made basic with ammonia, extracted with benzene and evaporated in vacuo to give residual 2-acetyl-10-[3-(1-carbethoxypiperazinyl)-propyl]-phenothiazine.

A solution of 6.5 g. of the above-prepared phenothiazine in 25 ml. of ethanol and 15 ml. of water containing 2.0 ml. of 40% sodium hydroxide is refluxed for two hours. Treating the reaction mixture as in Example 1 yields 2-acetyl-10-(3-piperazinylpropyl)-phenothiazine.

A solution of 2.0 g. of N-chlorosulfonylpiperidine in 10 ml. of xylene is added slowly to a solution of 3.7 g. of 2-acetyl-10-(3-piperazinylpropyl)-phenothiazine in 20 ml. of xylene. The resulting solution is refluxed for six hours and cooled. A white solid which separates is removed by filtration, washed with benzene and recrystallized to give 1-(1-piperidinylsulfonyl)-4-[3-(2-acetyl-10-phenothiazinyl)-propyl]-piperazine hydrochloride.

*Example 7*

A suspension of 4.9 g. of 2-methylmercaptophenothiazine (Belgian Patent 552,836) and 0.8 g. of sodium amide in 75 ml. of toluene is refluxed for 30 minutes. A solution of 5.2 g. of 1-carbethoxy-4-(3-chloropropyl)-piperazine in 50 ml. of toluene is added and the refluxing continued for eight hours. Working up the reaction mixture as in Example 1 gives 10-[3-(1-carbethoxy-4-piperazinyl)-propyl]-2-methylmercaptophenothiazine. A solution of the phenothiazine in aqueous ethanol in the presence of 40% sodium hydroxide solution is refluxed for two hours to give the hydrolysis product 2-methylmercapto-10-(3-piperazinylpropyl)-phenothiazine.

A solution of 2.9 g. of 1-carbethoxy-4-chlorosulfonylpiperazine (prepared by treating a benzene solution of triethylamine and N-carbethoxypiperazine with sulfuryl chloride at 0° C., filtering and removing the benzene in vacuo) in 15 ml. of toluene is added dropwise to a solution of 3.7 g. of 2-methylmercapto-10-(3-piperazinylpropyl)-phenothiazine in 15 ml. of toluene and the resulting solution is refluxed for four hours. Upon cooling a white solid separates which is filtered off and washed with benzene. This solid material in ethanol solution is treated with 2 equivalents of dilute sodium hydroxide solution and the resulting mixture is refluxed for two hours. The mixture is concentrated in vacuo, treated with benzene and water and the organic layer is separated, dried and evaporated to give 1-(1-piperazinylsulfonyl)-4-[3-(2- methylmercapto - 10 - phenothiazinyl) - propyl]-piperazine.

The free base in ethanol solution is treated with four equivalents of alcoholic hydrogen chloride to furnish, upon concentration and cooling, the tetrahydrochloride.

*Example 8*

To a solution of 284.5 g. of 3-bromophenyl methyl sulfide in 1425 ml. of dry chloroform at 10° C., dry chlorine in introduced while the solution is irradiated with a 150 watt lamp. The reaction mixture is maintained at 15–18° C. for six and one-half hours. The reaction is stopped and a vigorous stream of nitrogen is introduced. The solvent is removed under reduced pressure and the residue distilled to give a yellow oil, 3-bromophenyl trichloromethyl sulfide, B.P. 102–104° C./1.1 mm.

A mixture of 142.0 g. of 3-bromophenyl trichloromethyl sulfide and 110.0 g. of antimony trifluoride is heated in a distillation flask and the fraction is dissolved in 800 ml. of ether and washed several times with 6 N hydrochloric acid and then water. The ether solution is dried and the solvent removed under reduced pressure. Distillation at atmospheric pressure yields a colorless liquid, 3-bromophenyl trifluoromethyl sulfide, B.P. 192–194° C.

A mixture of 160.0 g. of 3-bromophenyl trifluoromethyl sulfide, 100.0 g. of acetanilide, 52.9 g. of anhydrous potassium carbonate and 2.1 g. of copper-bronze powder is heated in an oil bath at a bath temperature of 220–230° C. for 24 hours. The cooled dark brown viscous mass is extracted with 750 ml. of acetone and the solvent removed under reduced pressure. To the dark brown residue, 180 ml. of concentrated hydrochloric acid in 515 ml. of ethanol is added. The mixture is refluxed for five hours and allowed to stand at room temperature over night. It is then poured into 2.5 liters of cold water and made just alkaline with 20% sodium hydroxide. Extraction with ether and removal of the dried solvent under reduced pressure gives a dark residue which is vacuum distilled to yield a pale yellow oil, 3-trifluoromethylmercaptodiphenyl amine, B.P. 115–119° C./0.3 mm.

A mixture of 117.0 g. of 3-trifluoromethylmercaptodiphenyl amine, 25.0 g. of sulfur and 1.8 g. of iodine is heated in an oil bath at 145–160° C. for one and one-half hours under a stream of nitrogen. The cooled reaction mass is dissolved in one liter of boiling benzene and treated with chromatographic alumina and charcoal. Concentration of the filtrate gives a solid, 2-trifluoromethylmercaptophenothiazine, which recrystallizes from carbon tetrachloride as yellow plates, M.P. 165–166° C.

A mixture of 29.9 g of 2-trifluoromethylmercaptophenothiazine, 4.1 g. of sodamide and 25.7 g. of N-carbethoxy-N'-(3-chloropropyl)-piperazine is stirred and heated at reflux for eight hours. Working up the reaction mixture as in Example 1 yields 10-[3-(N-carbethoxypiperazinyl) - propyl]-2-trifluoromethylmercaptophenothiazine which is hydrolyzed by heating for 90 minutes in an aqueous ethanol solution containing slightly less than one equivalent of sodium hydroxide.

To a solution of 4.3 g. of 10-(3-piperazinylpropyl)-2-trifluoromethylmercaptophenothiazine in 25 ml. of benzene is added slowly a solution of 2.2 g. of 1-chlorosulfonyl-4-methylpiperazine (prepared by reacting a benzene solution of triethylamine and N-methylpiperazine with sulfuryl chloride at 0° C., filtering and evaporating the benzene in vacuo) in 25 ml. of benzene and the resulting mixture is refluxed for eight hours, then cooled. The solid material which separates is filtered off, washed with benzene and recrystallized to give 1-(4-methyl-1-piperazinylsulfonyl)-4-[3-(2-trifluoromethylmercapto-10- phenothiazinyl)-propyl]-piperazine hydrochloride.

*Example 9*

A mixture of 6.9 g. of 2-methylsulfonylphenothiazine (Belgian Patent 556,475), 1.0 g. of sodamide and 6.8 g. of 1 -carbethoxy-4-(3-chloropropyl)-3-ethylpiperazine with ethyl chloroformate, then with trimethylene bromohydrin and finally replacing the hydroxy group with chloro by toluene is refluxed for eight hours. Working up the reaction mixture as in Example 4 gives 10-[3-(1-carbethoxy-3 - ethyl-4-piperazinyl)-propyl] - 2 - methylsulfonylphenothiazine. The carbethoxy group is hydrolyzed in aqueous ethanol with 40% sodium hydroxide solution as in Example 1.

A solution of 1.9 g. of diethylsulfamyl chloride in 20 ml. of toluene is added dropwise to a solution of 4.3 g. of 10 - [3-(2-ethyl-1-piperazinyl)-propyl]-2-methylsulfonylphenothiazine in 20 ml. of toluene and the resulting solution is refluxed for six hours, then cooled. The solid material which separates is filtered off, washed with benzene and recrystallized to give 1-diethylsulfamyl-4-[3-(2-methylsulfonyl-10 - phenothiazinyl)-propyl]-3-ethylpiperazine hydrochloride.

The hydrochloride, in aqueous solution, is neutralized with dilute sodium hydroxide solution and extracted with benzene. The benzene extracts are concentrated in vacuo to give residual 1-diethylsulfamyl-4-[3-(2-methylsulfonyl-10-phenothiazinyl)-propyl]-3-ethylpiperazine.

*Example 10*

A solution of 8.0 g. of chromic anhydride, 8.0 g. of sulfuric acid and 25 ml. of water is mixed with 15.4 g. of 3-nitro-4-chlorophenyl trifluoromethyl sulfide and the resulting mixture is stirred for 15 hours at 120–130° C.

Steam distilling the reaction mixture yields 3-nitro-4-chlorophenyltrifluoromethyl sulfone.

A solution of 4.0 g. of sodium hydroxide pellets in 30 ml. of water is added to 18.9 g. of 2-bromothiophenol dissolved in 250 ml. of ethanol and the resulting mixture added to a solution of 28.9 g. of 3-nitro-4-chlorophenyl trifluoromethyl sulfone in 100 ml. of ethanol. The suspension is refluxed for three hours. The solid present is filtered from the hot reaction mixture and washed several times with hot ethanol. The combined alcoholic filtrate is diluted with a small amount of water and cooled to yield 2'-bromo-2-nitro-4-trifluoromethylsulfonyldiphenyl sulfide.

A solution of 225.7 g. of stannous chloride crystals in 750 ml. of concentrated hydrochloric acid is carefully mixed with 44.2 g. of 2'-bromo-2-nitro-4-trifluoromethylsulfonyldiphenyl sulfide. The mixture is stirred and refluxed for five hours. The cooled reaction mixture is filtered and the separated solid metal complex is broken up by hydrolysis for one hour at reflux with 10% caustic soda and washed with benzene. The organic layer is separated and combined with further benzene washes. The solvent is then removed by distillation in vacuo and upon purification of the residue, 2'-bromo-2-amino-4-trifluoromethylsulfonyldiphenyl sulfide is obtained.

A suspension of 20.6 g. of 2'-bromo-2-amino-4-trifluoromethylsulfonyldiphenyl sulfide, 8.3 g. of anhydrous potassium carbonate and 0.4 g. of copper-bronze powder in 200 ml. of dimethylformamide is stirred and heated at reflux for 18 hours. The cooled reaction mixture is filtered and the filtrate diluted with water. The solid which thus forms is vacuum sublimed at 0.05 mm. (175–195° C.) and recrystallized to give pure 2-trifluoromethylsulfonylphenothiazine.

A mixture of 3.3 g. of 2-trifluoromethylsulfonylphenothiazine, 0.4 g. of sodium amide and 2.6 g. of N-carbethoxy-N'-(3-chloropropyl)-piperazine in 100 ml. of toluene is heated at reflux for eight hours. The cooled reaction mixture is worked up following Example 1 to give 10 - [3 - (N - carbethoxypiperazinyl)-propyl]-2-trifluoromethylsulfonylphenothiazine.

A solution of 5.3 g. of 10-[3-(N-carbethoxypiperazinyl)-propyl]-2-trifluoromethylsulfonylphenothiazine in 30 ml. of ethanol and 10 ml. of water containing 1 ml. of 40% sodium hydroxide solution is refluxed for 90 minutes. Removing the solvent and treating as in Example 1 gives 10-(3-piperazinylpropyl)-2-trifluoromethylsulfonylphenothiazine.

To a solution of 4.6 g. of 10-(3-piperazinylpropyl)-2-trifluoromethylsulfonylphenothiazine in 20 ml. of benzene is added slowly a solution of 1.6 g. of dimethylsulfamyl chloride in 10 ml. of benzene. The resulting mixture is refluxed for six hours. Upon cooling a white solid which separates is filtered off, washed with benzene and recrystallized to give 1-dimethylsulfamyl-4-[3-(2-trifluoromethylsulfonyl-10-phenothiazinyl)-propyl] - piperazine hydrochloride.

An aqueous solution of the hydrochloride is neutralized with dilute sodium hydroxide solution and extracted with chloroform. Evaporation of the chloroform extracts leaves, as the residue, 1-dimethylsulfamyl-4-[3-(2-trifluoromethylsulfonyl-10-phenothiazinyl) - propyl]-piperazine.

A solution of the free base in ethyl acetate is treated with three equivalents of tartaric acid. Upon concentration and cooling the tritartrate salt is obtained.

Example 11

A mixture of 4.5 g. of 2-cyanophenothiazine (Belgian Patent 552,557), 0.8 g. of sodium amide and 5.2 g. of 1-carbethoxy-4-(3-chloropropyl)-piperazine in 100 ml. of toluene is stirred and refluxed for nine hours. Working up as in Example 1 yields 10-[3-(1-carbethoxy-4-piperazinyl)-propyl]-2-cyanophenothiazine. The latter compound is hydrolyzed by refluxing an aqueous ethanol solution with 40% sodium hydroxide solution.

A solution of 1.6 g. of dimethylsulfamyl chloride in 10 ml. of xylene is added dropwise to a solution of 3.5 g. of 2-cyano-10-(3-piperazinylpropyl)-phenothiazine (prepared as above) in 20 ml. of xylene. The resulting mixture is refluxed for four hours then cooled. The solid material which separates from the reaction mixture is filtered off, washed with benzene and recrystallized from isopropanol to give 1-dimethylsulfamyl-4-[3-(2-cyano - 10 - phenothiazinyl)-propyl]-piperazine hydrochloride.

An aqueous solution of the hydrochloride is neutralized with dilute sodium hydroxide solution. Extraction with benzene and evaporation of the benzene extracts gives, as the residue, 1-dimethylsulfamyl-4-[3-(2-cyano-10-phenothiazinyl)-propyl]-piperazine.

Example 12

Sulfuryl chloride (13.5 g.) is added to a solution of 3.9 g. of 10-(3-piperazinylpropyl)-2-trifluoromethylphenothiazine (prepared as in Example 1) and 1.0 g. of triethylamine in 100 ml. of benzene at 0° C. The resulting mixture is subsequently filtered and the filtrate evaporated in vacuo to give 1-chlorosulfonyl-4-[3-(2-trifluoromethyl-10-phenothiazinyl)-propyl]-piperazine.

A solution of 4.9 g. of the above-prepared chlorosulfonyl piperazine in 75 ml. of benzene is added to a large excess of ethylamine dissolved in benzene at 0° C. The solvent is removed in vacuo to give after purification 1-monoethylsulfamyl - 4-[3-(2-trifluoromethyl-10-phenothiazinyl)-propyl]-piperazine.

Similarly, employing a large excess of methylamine as described above yields 1-monomethylsulfamyl-4-[3-(2-trifluoromethyl-10-phenothiazinyl)-propyl]-piperazine.

What is claimed is:

1. A chemical compound of the class consisting of a free base and its nontoxic pharmaceutically acceptable acid addition salts, said free base having the formula:

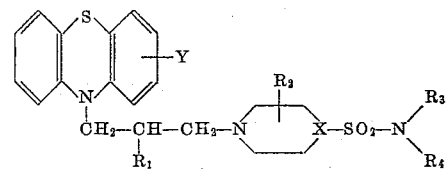

in which Y is a member selected from the group consisting of hydrogen, chlorine, methyl, trifluoromethyl, methoxy, acetyl, methylmercapto, trifluoromethylmercapto, methylsulfonyl, trifluoromethylsulfonyl, and cyano; $R_1$ is a member selected from the group consisting of hydrogen and methyl; $R_2$ is a member selected from the group consisting of hydrogen, methyl, and ethyl; and $R_3$ and $R_4$ are members selected from the group consisting of hydrogen, methyl, ethyl and, taken together with the nitrogen to which they are attached, piperidinyl, piperazinyl and N-methylpiperazinyl.

2. A chemical compound having the basic structural formula:

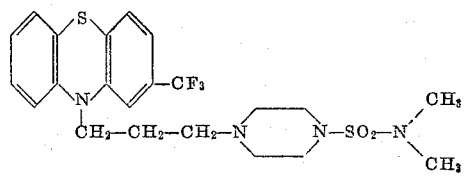

3. A chemical compound having the basic structural formula:

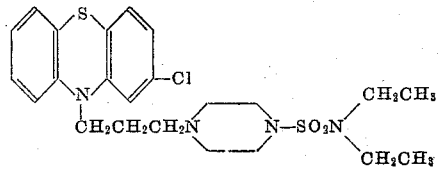

4. A chemical compound having the basic structural formula:
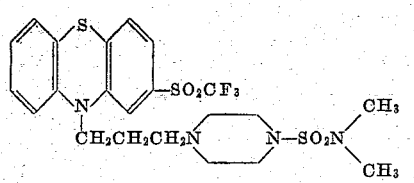
5. A chemical compound having the basic structural formula:
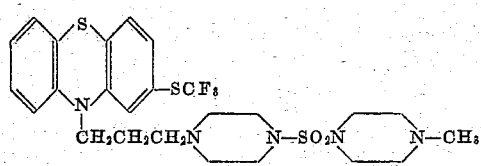
6. A chemical compound having the basic structural formula:
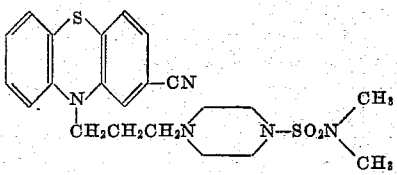
No references cited.